United States Patent
Shimizu et al.

(10) Patent No.: US 8,654,415 B2
(45) Date of Patent: Feb. 18, 2014

(54) LIGHT SCANNING DEVICE AND IMAGE FORMATION APPARATUS

(75) Inventors: Takeshi Shimizu, Chino (JP); Shuichi Wakabayashi, Okaya (JP)

(73) Assignee: Seiko Epson Corporation (JP)

( * ) Notice: Subject to any disclaimer, the term of this patent is extended or adjusted under 35 U.S.C. 154(b) by 122 days.

(21) Appl. No.: 13/442,264

(22) Filed: Apr. 9, 2012

(65) Prior Publication Data

US 2012/0257262 A1      Oct. 11, 2012

(30) Foreign Application Priority Data

Apr. 11, 2011   (JP) ................................. 2011-087763

(51) Int. Cl.
  *H04N 1/04*      (2006.01)
(52) U.S. Cl.
  USPC ............ 358/475; 358/474; 358/486; 358/498
(58) Field of Classification Search
  USPC .................. 358/475, 474, 486, 498
  See application file for complete search history.

(56) References Cited

U.S. PATENT DOCUMENTS 6,937,372 B2   8/2005  Kandori et al.
8,519,324 B2 *  8/2013  Tsuida .......................... 250/235

FOREIGN PATENT DOCUMENTS

JP      2003-131151       5/2003

* cited by examiner

*Primary Examiner* — Houshang Safaipour
(74) *Attorney, Agent, or Firm* — Harness, Dickey & Pierce, P.L.C.

(57) ABSTRACT

A light scanning device includes: a movable section which has a light reflection section reflecting light and oscillates around an oscillating axis and in which a maximum deflection angle thereof is variable; and a detection section which detects the maximum deflection angle of the movable section, wherein the detection section includes a light source which irradiates light toward the light reflection section, a light-receiving section which receives reflected light of the light from the light source, reflected by the light reflection section, and a displacement drive section which changes a position of the light-receiving section in accordance with the maximum deflection angle of the movable section.

19 Claims, 9 Drawing Sheets

LIGHT SCANNING DEVICE AND IMAGE FORMATION APPARATUS

BACKGROUND

1. Technical Field

The present invention relates to a light scanning device and an image formation apparatus.

2. Related Art

For example, as an apparatus which displays a desired image (for example, promotional advertising such as a commercial message) on a screen, an apparatus configured so as to scan the screen in a horizontal direction and a vertical direction with laser light emitted from a light source by using two galvano-mirrors is known (refer to JP-A-2003-131151, for example). Further, in an apparatus described in JP-A-2003-131151, a drive timing of each galvano-mirror is controlled on the basis of a detection signal of an optical sensor fixed on the screen. Further, the maximum displacement angle of the galvano-mirror can also be sought from the detection signal of the optical sensor.

However, in the apparatus described in JP-A-2003-131151, in the case of changing the size of an image on the screen by changing the maximum displacement angle of the galvano-mirror, since the optical sensor is fixed with respect to the screen, according to the magnitude of the maximum displacement angle of the galvano-mirror (particularly, in a case where the maximum displacement angle is "large"), the detection accuracy of the optical sensor tends to be lowered. For example, in a case where the maximum displacement angle is 40 degrees and the optical sensor is installed at a position where it reacts best to the maximum displacement angle, if the maximum displacement angle is changed to 80 degrees, the resolving power of the deflection angle which can be detected by the optical sensor, is lowered. In this manner, in the apparatus described in JP-A-2003-131151, there is a problem in that a difference occurs in the detection accuracy of the maximum displacement angle, so that it is not possible to accurately detect and control turning (oscillation) of the galvano-mirror at the maximum displacement angle.

SUMMARY

An advantage of some aspects of the invention is that it provides a light scanning device and an image formation apparatus, in which even if the maximum deflection angle of a movable section is changed, the detection accuracy of the maximum deflection angle can be maintained.

An aspect of the invention is directed to a light scanning device including: a movable section which has a light reflection section reflecting light and oscillates around an oscillating axis perpendicular to the thickness direction of the plate-like body and in which a maximum deflection angle thereof is variable; and a detection section which detects the maximum deflection angle of the movable section, wherein the detection section includes a light source which irradiates light toward the light reflection section, a light-receiving section which receives reflected light of the light from the light source, reflected by the light reflection section, and a displacement drive section which changes a position of the light-receiving section in accordance with the maximum deflection angle of the movable section.

According to this configuration, even if the maximum deflection angle of the movable section is changed, it is possible to reliably maintain the detection accuracy of the maximum deflection angle.

In the light scanning device according to the above aspect of the invention, when the maximum deflection angle is set to be $\theta$max and an angle made by the light source, the oscillating axis of the movable section, and the light-receiving section is set to be $2\theta 0$, it is preferred that the displacement drive section changes the position of the light-receiving section such that a ratio $\theta$max/$\theta 0$ of $\theta$max and $\theta 0$ becomes constant. According to this configuration, even if the maximum deflection angle of the movable section is changed, it is possible to more reliably maintain the detection accuracy of the maximum deflection angle.

In the light scanning device according to the above aspect of the invention, it is preferred that the ratio $\theta$max/$\theta 0$ is any value of values exceeding 1 and equal to or less than 1.3. According to this configuration, even if the maximum deflection angle of the movable section is changed, it is possible to more reliably maintain the detection accuracy of the maximum deflection angle.

In the light scanning device according to the above aspect of the invention, it is preferred that the displacement drive section includes a motor having a rotating shaft, a control section having a function to control an operation of the motor, and a support beam which is connected to the shaft and supports the light-receiving section.

According to this configuration, it is possible to make the configuration of the displacement drive section relatively simple.

In the light scanning device according to the above aspect of the invention, it is preferred that the shaft is disposed on the same axis as the oscillating axis of the movable section. According to this configuration, control when displacing the light-receiving section by the displacement drive section becomes easy.

In the light scanning device according to the above aspect of the invention, it is preferred that the displacement drive section has a function to regulate a distance between the movable section and the light-receiving section to be constant. According to this configuration, the optical path length of light until light emitted from the light source is reflected by the light reflection section of the movable section and then reaches the light-receiving section can be made to be constant, so that it is possible to stably receive the reflected light by the light-receiving section.

In the light scanning device according to the above aspect of the invention, it is preferred that the light-receiving section is a photodiode.

According to this configuration, the light-receiving section generates an electric current having intensity corresponding to the intensity of the received light. Then, it becomes easy to determine whether or not the light-receiving section receives light, on the basis of the magnitude relation between the magnitude of the electric current and a preset given threshold.

In the light scanning device according to the above aspect of the invention, it is preferred that the light source is configured so as to perform irradiation of laser light. Since the laser light is light having excellent optical properties such as directivity, convergence, and high brightness, it is possible to reliably irradiate the laser light toward the light reflection section of the movable section.

In the light scanning device according to the above aspect of the invention, when forming an image on an upstanding screen by light, it is preferred that the movable section performs horizontal light scanning on the screen by the light reflection section.

According to this configuration, when projecting an image on, for example, an upstanding screen, in the case of desiring to change the horizontal size of the image, by making the maximum deflection angle variable, it is possible to reliably perform the change.

Another aspect of the invention is directed to an image forming apparatus including: the light scanning device according to the above aspect of the invention, wherein the light reflection section performs light scanning, and forms an image. According to the configuration of this aspect, even if the maximum deflection angle of the movable section is changed, it is possible to more reliably maintain the detection accuracy of the maximum deflection angle.

Still another aspect of the invention is directed to an image forming apparatus including: a movable section which has a light reflection section reflecting light and oscillates around an oscillating axis and in which a maximum deflection angle thereof is variable; and a detection section which detects the maximum deflection angle of the movable section, wherein the detection section includes a light source which irradiates light toward the light reflection section, a light-receiving section which receives reflected light of the light from the light source, reflected by the light reflection section, and a displacement drive section which changes a position of the light-receiving section in accordance with the maximum deflection angle of the movable section, and an image is formed by performing light scanning by the light reflection section.

According to the configuration of this aspect, even if the maximum deflection angle of the movable section is changed, it is possible to more reliably maintain the detection accuracy of the maximum deflection angle.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a light scanning device and an image forming apparatus according to the invention will be described in detail on the basis of preferred embodiments shown in the accompanying drawings.

First Embodiment

Figure 1:
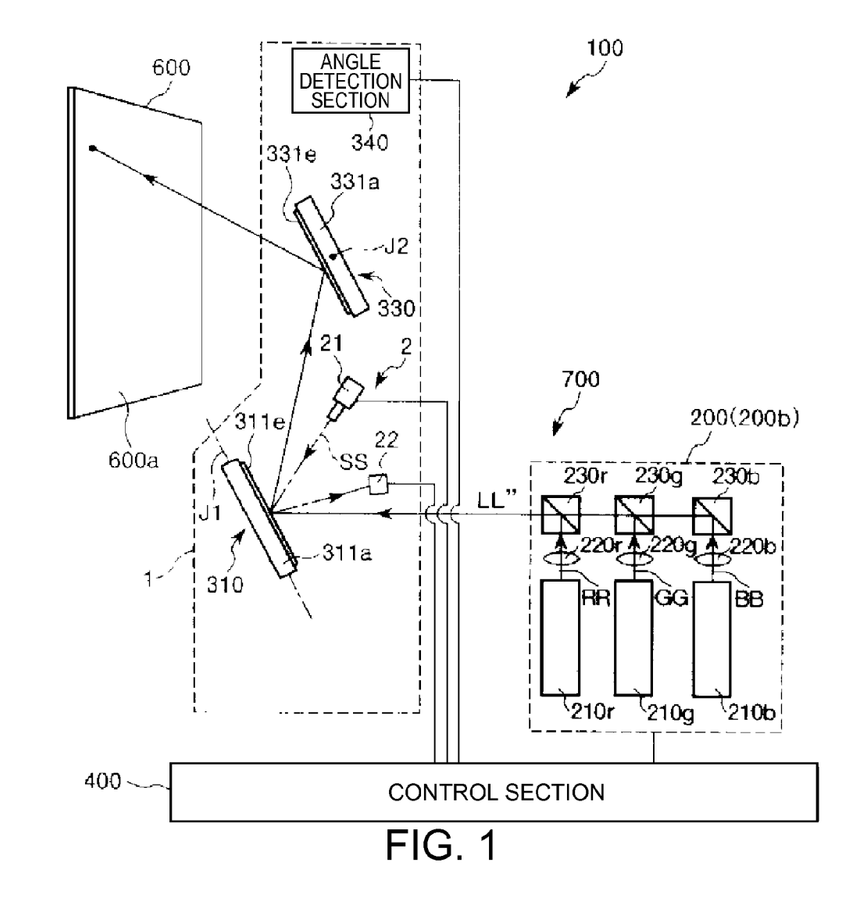
FIG. 1 is a diagram showing the schematic configuration of a projector which is included in an image forming apparatus (a first embodiment) according to the invention.
Figure 2:
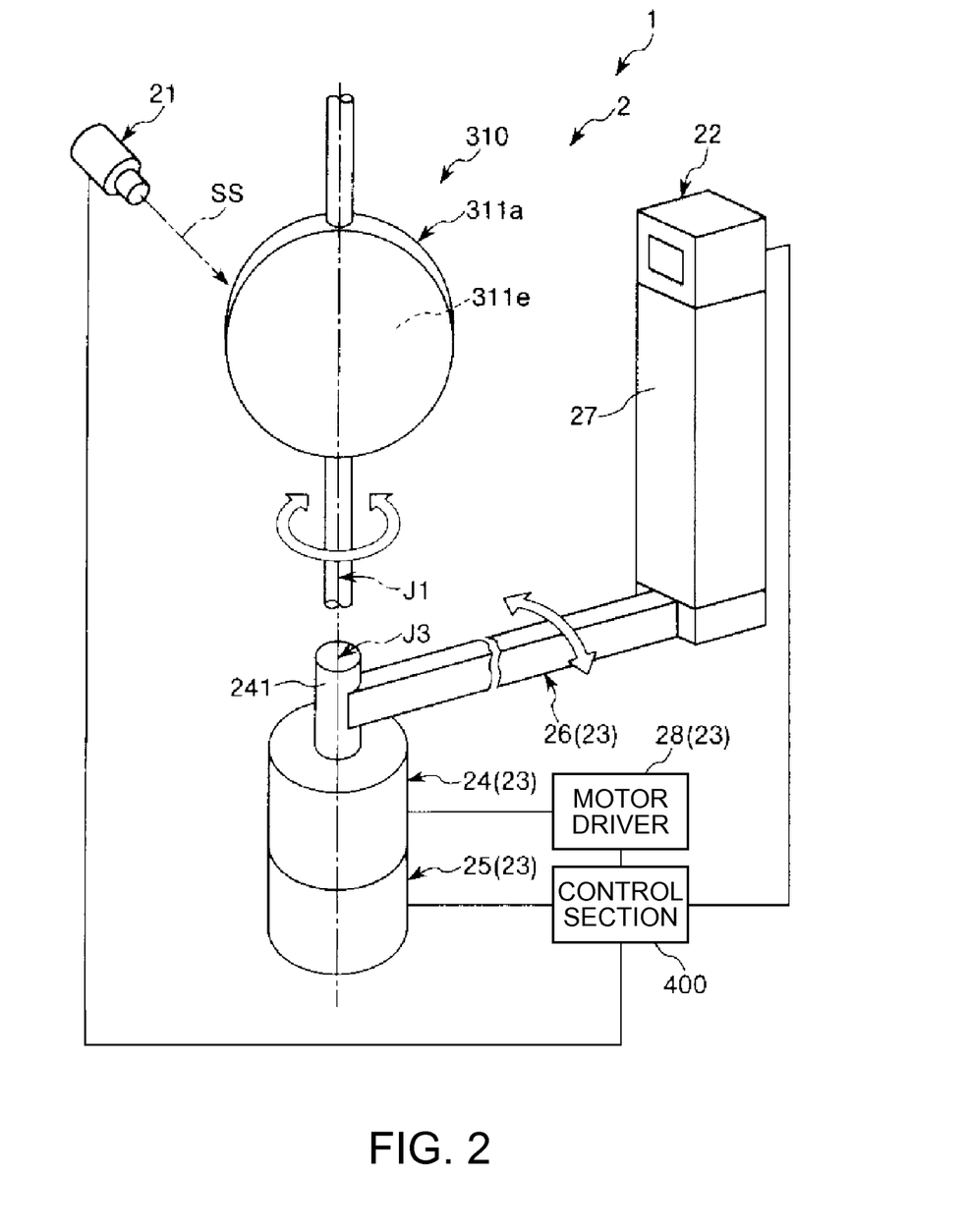
FIG. 2 is a perspective view showing a light scanning device built into the projector shown in FIG. 1.
Figure 3:
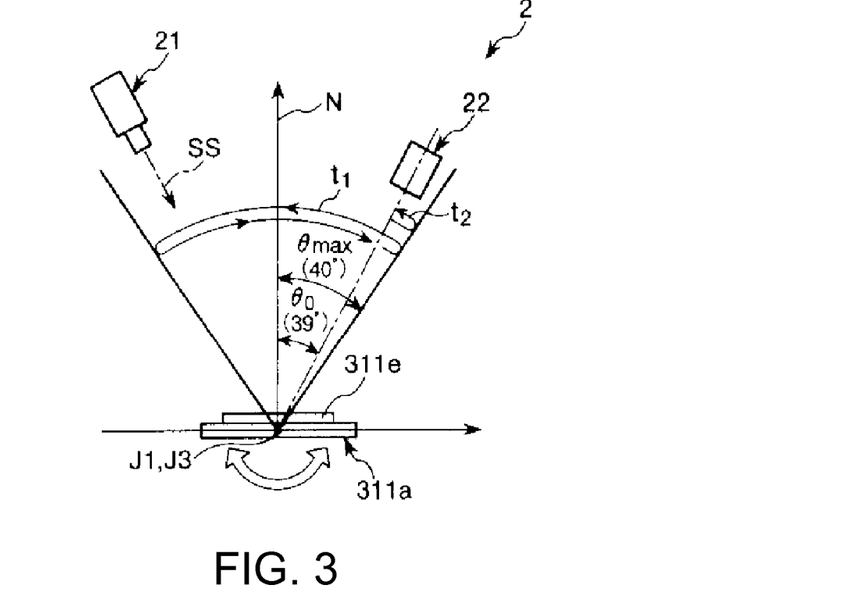
FIG. 3 is a plan view showing an operation state of the light scanning device shown in FIG. 2.
Figure 4:
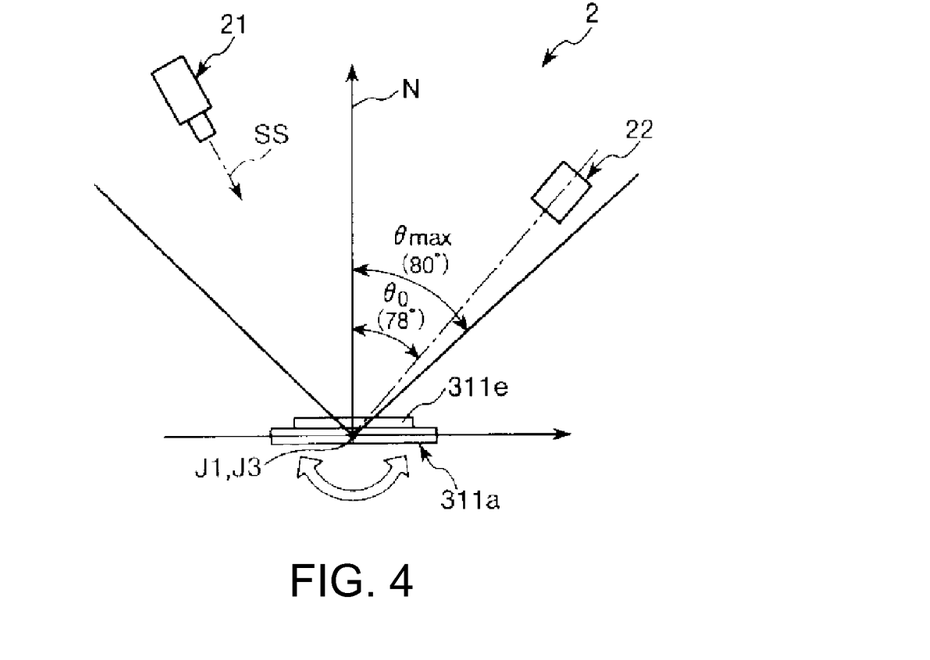
FIG. 4 is a plan view showing an operation state of the light scanning device shown in FIG. 2.

FIG. 1 is a diagram showing the schematic configuration of a projector which is included in an image forming apparatus (a first embodiment) according to the invention, FIG. 2 is a perspective view showing a light scanning device built into the projector shown in FIG. 1, and FIGS. 3 and 4 respectively are plan views showing operation states of the light scanning device shown in FIG. 2. In addition, in the following, for convenience of explanation, the upper side in FIG. 2 is referred to as a "top" or an "upside" and the lower side is referred to as a "bottom" or a "downside".

An image forming apparatus 100 according to this embodiment shown in FIG. 1 includes a screen (a display object) 600 installed inside (indoors) a structure such as a building, for example, or outdoors, and a projector 700 which displays a given image such as a still image or a moving image on a display surface 600a formed in front of the screen 600.

The screen 600 is fixed to, for example, a wall or the like of a building. The display surface 600a of the screen 600 is a light impermeable, that is, opaque, for example, a white display surface. Accordingly, it is possible to clearly display an image by display light LL" (described later) from the projector 700.

Further, the projector 700 in this embodiment is provided in the vicinity of the screen 600 and configured so as to display an image by proximity projection to the screen 600. In this embodiment, the projector 700 is provided in front bottom of the screen 600. Further, the projector 700 is provided within 1 m from the site closest to the projector 700 of the display surface 600a of the screen 600. By providing the projector 700 in the vicinity of the screen 600 in this manner, it is possible to effectively prevent the display light LL" which is irradiated from the projector 700 from being interrupted by an obstacle such as a pedestrian, for example, so that it is possible to more reliably display a desired image on the display surface 600a.

As shown in FIG. 1, the projector 700 includes a light source unit (a light emitting section) 200 which emits the display light LL", a light scanning device (a light scanning section) 1 which reflects the display light LL" emitted from the light source unit 200 and then scans the display surface 600a of the screen 600 with the display light LL", and a control section 400 which controls operations of the light source unit 200 and the light scanning device 1. Further, the light source unit 200 includes a light source for display light 200b which emits the display light LL" for displaying an image on the display surface 600a.

The light source for display light 200b includes laser light sources 210r, 210g, and 210b of the respective colors, and collimator lenses 220r, 220g, and 220b and dichroic mirrors 230r, 230g, and 230b provided corresponding to the laser light sources 210r, 210g, and 210b of the respective colors. The laser light sources 210r, 210g, and 210b of the respective colors respectively emit red, green, and blue laser lights RR, GG, and BB. Each of the laser lights RR, GG, and BB is emitted in a modulated state in response to a drive signal which is transmitted from the control section 400, and collimated by each of the collimator lenses 220r, 220g, and 220b, thereby being turned into a thin beam.

The dichroic mirrors 230r, 230g, and 230b respectively have characteristics reflecting the red laser light RR, the green laser light GG, and the blue laser light BB, so that it is possible to emit a single display light LL" (laser light) by combining the laser lights RR, GG, and BB of the respective colors.

In addition, in place of the collimator lenses 220r, 220g, and 220b, collimator mirrors can be used, and also in this case, it is possible to form a thin beam having parallel light flux. Further, in a case where parallel light flux is emitted from each of the laser light sources 210r, 210g, and 210b of the respective colors, the collimator lenses 220r, 220g, and 220b can be omitted. Further, the laser light sources 210r, 210g, and 210b can be replaced with light sources such as light-emitting diodes which generate the same light flux. Further, the order of the laser light sources 210r, 210g, and 210b of the respective colors, the collimator lenses 220r, 220g, and 220b, and the dichroic mirrors 230r, 230g, and 230b in FIG. 1 is only one example, and the order can be freely set while maintaining combination in each color (for red, the laser light source 210r, the collimator lens 220r, and the dichroic mirror 230r; for green, the laser light source 210g, the collimator lens 220g, and the dichroic mirror 230g; and for blue, the laser light source 210b, the collimator lens 220b, and the dichroic mirror 230b). For example, the combination of blue, red, and green in order close to an optical scanner 310 is also possible. The light scanning device 1 has a function to scan the display surface 600a of the screen 600 with the display light LL" emitted from the light source unit 200. Such a light scanning device 1 includes the optical scanner 310 that is a mirror for horizontal scanning which scans the display surface 600a in the horizontal direction (an x direction) with the display light LL" emitted from the light source unit 200, an optical scanner 330 that is a mirror for vertical scanning which scans the display surface 600a in the vertical direction (a y direction) with the display light LL" emitted from the light source unit 200, and an angle detection section 340 which detects the turning (oscillation) angle (behavior) of a movable plate 331a that the optical scanner 330 has.

A movable plate (a movable section) 311a is constituted by a plate-like body. Then, in the movable plate 311a, a light reflection section (a mirror) 311e having light reflectivity is provided on the surface on one side thereof. Further, the movable plate 311a turns (oscillates) around a central axis of turning (an axis of oscillation) J1 perpendicular to the thickness direction thereof, for example, by electromagnetic drive using an electromagnetic coil (not shown) and a permanent magnet (not shown). Due to this turning, it is possible to scan the screen 600 in the horizontal direction with the display light LL" reflected by the light reflection section 311e. Further, the magnitude of a maximum deflection angle (turning angle) $\theta_{max}$ of the movable plate 311a can be changed by adjusting the magnitude of voltage which is applied to the electromagnetic coil and drive frequency by the control section 400 (refer to FIGS. 3 and 4). For example, in the case of desiring to change the size (projection size) in the horizontal direction of an image on the screen 600, by making the magnitude of the maximum deflection angle $\theta_{max}$ variable, it is possible to reliably perform the change. Here, the maximum deflection angle $\theta_{max}$ refers to the maximum angle to each of the left and the right in FIGS. 3 and 4 with respect to a normal line N to the movable plate 311a in the initial state where the movable plate 311a does not yet operate.

Incidentally, in a case where the deflection angle of the movable plate 311a of the optical scanner 310 is constant, the deflection width of the display light LL" in a light emission state changes according to the angle of the movable plate 331a of the optical scanner 330, and the more the vertical position on the display surface 600a, which the display light LL" scans, is distant from the projector 700, the greater the deflection width becomes. Therefore, in the projector 700, by making the deflection angle of the movable plate 311a smaller as a vertical position on the display surface 600a is more distant from the projector 700, the deflection width of the display light LL" in a light emission state is made to be constant along the vertical direction. So-called "trapezoidal deflection" can be corrected by performing such a correction.

The movable plate 331a is also constituted by a plate-like body. Then, in the movable plate 331a, a light reflection section (a mirror) 331e having light reflectivity is provided on the surface on one side thereof. Further, the movable plate 331a is driven around the central axis of turning J2 which is in a skew positional relationship with the central axis of turning J1, for example, by electromagnetic drive using an electromagnetic coil (not shown) and a permanent magnet (not shown). Due to this turning, it is possible to scan the screen 600 in the vertical direction with the display light LL" reflected by the light reflection section 331e. Then, an image can be formed on the screen 600 by this vertical scanning and the above-described horizontal scanning.

Further, adjustment of the magnitude of the maximum deflection angle of the movable plate 331a is also performed by adjusting the magnitude of voltage which is applied to the electromagnetic coil provided corresponding to the movable plate 331a, by the control section 400.

The movable plate 311a (except for the light reflection section 311e) or the movable plate 331a (except for the light reflection section 331e) is constituted using, for example, silicon as a main material. Each of the light reflection sections 311e and 331e is constituted by, for example, a metal thin film formed by, for example, vapor deposition.

The angle detection section 340 can be constituted, for example, by a resistance change detection section which detects a resistance change of a strain gauge that detects stress which is generated in the movable plate 331a when the movable plate 331a moves, and the strain gauge, which is involved in a stress change of the movable plate, and an angle sensing section which seeks an angle (senses the behavior) of the corresponding movable plate 331a on the basis of the detection result of the resistance change detection section. Further, it can also be constituted by a piezoelectric element, an electromotive force detection section which detects an electromotive force that is generated from the piezoelectric element, and an angle sensing section which seeks an angle (senses the behavior) of the corresponding movable plate on the basis of the detection result of the electromotive force detection section. The control section 400 is configured so as to control operations of the light source unit 200 and the light scanning device 1 such that the display light LL" is irradiated from image data transmitted from a computer (not shown) or the like, which is displayed on the display surface 600a of the screen 600. In this way, it is possible to more reliably display a desired image on the display surface 600a.

Incidentally, as shown in FIGS. 1 and 2, the light scanning device 1 further includes a turning detection section (a detection section) 2 which detects turning of the movable plate 311a of the optical scanner 310 at the maximum deflection angle $\theta_{max}$. In the light scanning device 1, by an operation of the turning detection section 2, it can be ensured that the movable plate 311a turns at the maximum deflection angle $\theta_{max}$ within a given range of detection accuracy (the maximum deflection angle $\theta_{max}\pm 1$ degree) which will be described later. As shown in FIG. 2, the turning detection section 2 includes a light source 21 which irradiates laser light SS toward the light reflection section 311e of the movable plate 311a, a light-receiving section 22 which receives the reflected light of the laser light SS from the light source 21 reflected by the light reflection section 311e, and a displacement drive section 23 which changes a position of the light-receiving section 22 in accordance with the maximum deflection angle $\theta_{max}$ of the movable plate 311a. Further, the light source 21, the light-receiving section 22, and the displacement drive section 23 are disposed outside an optical path of the display light LL" from the light source unit 200 in the light scanning device 1, that is, at positions where interference with the display light LL" is prevented.

The light source 21 is fixed, for example, to a casing (not shown) of the light scanning device 1. In addition, it is preferable that the light source 21 be disposed at a position where interference of the laser light SS with the display light LL" is prevented.

Further, the light source 21 is electrically connected to the control section 400. In this way, control of switching the light source 21 on or off can be performed.

Such a light source 21 can perform irradiation of the laser light SS. Since the laser light SS is light having excellent optical properties such as directivity, convergence, and high brightness, it is possible to reliably irradiate the laser light SS toward the light reflection section 311e of the movable plate 311a. In addition, the laser light SS is not particularly limited and, for example, a gas laser such as He—Ne laser, a solid-state laser such as Nd—YAG laser, a semiconductor laser such as GaAlAs laser, or the like can be used.

The laser light SS (reflected light) reflected by the light reflection section 311e of the movable plate 311a is received by the light-receiving section 22. The light-receiving section 22 is constituted by a photodiode electrically connected to the control section 400. In this way, the light-receiving section 22 generates an electric current having intensity corresponding to the intensity of the laser light SS received. Then, it becomes easy to determine whether or not the light-receiving section 22 receives the laser light SS, on the basis of the magnitude relation between the magnitude of the electric current and a preset given threshold. In addition, the threshold is stored in the control section 400. Incidentally, in a case where the light-receiving section 22 is fixedly installed with respect to the central axis of turning J1 of the movable plate 311a, when the maximum deflection angle $\theta_{max}$ becomes an angle which is significantly large compared to the installation angle of the light-receiving section 22, that is, an angle made by the light source 21, the central axis of turning J1 of the movable plate 311a, and the light-receiving section 22, the detection accuracy (resolving power) of the light-receiving section 22 is lowered. The maximum deflection angle $\theta_{max}$ can be obtained from the following expression (1).

$$\frac{t_2}{t_1} = \frac{1}{\pi}\arccos\frac{\theta_0}{\theta_{max}} \quad (1)$$

In addition, as shown in FIG. 3, $t_1$ is a time that elapses, in a case where the normal line to the light reflection section 311e of the movable plate 311a starts to turn from a line connecting the central axis of turning J1 of the movable plate 311a and the light-receiving section 22, before the normal line reciprocates and returns to the line again, that is, a round-trip time (one cycle) when the movable plate 311a turns. Further, $t_2$ is a time that elapses, in a case where the normal line to the light reflection section 311e of the movable plate 311a starts to turn from the line connecting the central axis of turning J1 of the movable plate 311a and the light-receiving section 22, before the normal line turns in a direction of turning limit (in the clockwise direction in FIG. 3) beyond the light-receiving section 22 and then returns to the line. For example, in a case where the maximum deflection angle $\theta_{max}$ is 40 degrees and the light-receiving section 22 is installed at a position where it most reacts to the maximum deflection angle $\theta_{max}$, if the maximum deflection angle $\theta_{max}$ is changed to 80 degrees, the detection accuracy (sensitivity) of the light-receiving section 22 is lowered. In this manner, in a case where the light-receiving section 22 is fixedly installed, a difference occurs in the detection accuracy of the light-receiving section 22, so that it cannot be ensured that the movable plate 311a turns at the maximum deflection angle $\theta_{max}$.

Therefore, in the light scanning device 1, a configuration is made so as to prevent such defects. Specifically, the light scanning device 1 is configured such that when the maximum deflection angle $\theta_{max}$ has changed, a position of the light-receiving section 22 is changed in conjunction with the change, that is, the light-receiving section 22 is turned by a follow-up angle (a turning angle) $\theta_0$ around a central axis of turning J3 (refer to FIGS. 3 and 4). As a mechanism which changes the position of the light-receiving section 22, the displacement drive section 23 is provided. In addition, the follow-up angle $\theta_0$ is an angle equivalent to ½ of the angle made by the light source 21, the central axis of turning J1 of the movable plate 311a, and the light-receiving section 22. Further, as shown in FIG. 2, the displacement drive section 23 that the turning detection section 2 has includes a motor 24, a motor driver 28 (the control section 400), an encoder 25, and a support beam 26. Accordingly, the displacement drive section 23 can be constituted by four components, so that it is possible to make the configuration of the displacement drive section 23 relatively simple.

The motor 24 is, for example, a servomotor having a rotating shaft 241. The motor 24 is electrically connected to the control section 400 through the motor driver 28. Instructions about the turning conditions (the follow-up angle $\theta_0$, the turning speed, and the like) of the shaft 241 from the control section 400 are transmitted to the motor driver 28. The motor driver 28 can control an operation of the motor 24 in accordance with the instructions.

Further, the actual follow-up angle $\theta_0$ or the like of the shaft 241 can be sensed by the encoder 25. The sensing result is feed-backed to the control section 400, so that a precise operation of the motor 24 can be controlled.

As shown in FIGS. 2 to 4, the motor 24 is disposed such that the central axis of turning J3 of the shaft 241 is located on the same axis as the central axis of turning J1 of the movable plate 311a. In this way, control "to satisfy a relationship in which a ratio $\theta_{max}/\theta_0$ becomes constant" in the control section 400, which will be described later, becomes easy.

The support beam 26 having an elongated shape is connected to the shaft 241 of the motor 24. The support beam 26 extends in a direction perpendicular to the shaft 241 and supports, at an end portion thereof, the light-receiving section 22 through a spacer 27. In this way, when the shaft 241 turns around the central axis of turning J3, the light-receiving section 22 can also turn around the central axis of turning J3 (refer to FIGS. 2 to 4).

As a constituent material of the support beam 26, it is not particularly limited and, for example, various metal materials such as aluminum and stainless steel, or various resin materials such as polypropylene can be used. Then, by constituting the support beam 26 by such a relatively hard material, the support beam 26 can regulate a distance between the light-receiving section 22 and the movable plate 311a (the central axis of turning J1) to be constant. In this way, the optical path length of the laser light SS until the laser light SS emitted from the light source 21 is reflected by the light reflection section 311e of the movable plate 311a and then reaches the light-receiving section 21 can be made to be constant regardless of the magnitude of the follow-up angle $\theta_0$, so that the intensity of the laser light SS which is received by the light-receiving section 22 also becomes constant, that is, stable light-receiving becomes possible.

Next, control of the control section 400 (an operation of the light scanning device 1) when confirming that even if the maximum deflection angle $\theta_{max}$ has varied, the movable plate 311a turns at the maximum deflection angle $\theta_{max}$, will be described with reference to FIGS. 3 and 4. Hereinafter, a state shown in FIG. 3 is referred to as a "first state" and a state shown in FIG. 4 is referred to as a "second state".

In the control section 400, control is performed so as to satisfy a relationship in which the ratio $\theta_{max}/\theta_0$ of the maximum deflection angle $\theta_{max}$ and the follow-up angle $\theta_0$ becomes constant. As the ratio $\theta_{max}/\theta_0$, it is not particularly limited and, for example, any value of values exceeding 1 and equal to or less than 1.3 is preferable, and any value of values equal to or more than 1.01 and equal to or less than 1.25 is more preferable. In addition, the value of the ratio $\theta_{max}/\theta_0$ is stored in the control section 400 in advance, and in the following description, it is assumed that the value is set to be 1.03, for example.

In the first state shown in FIG. 3, it is assumed that the movable plate 311a turns at the maximum deflection angle $\theta_{max}$ that is, for example, 40 degrees. At this time, since it is acceptable if a relationship, the ratio $\theta_{max}/\theta_0=1.03$, is satisfied, it is acceptable if the light-receiving section 22 is disposed at a position where the follow-up angle $\theta_0$ becomes 39 degrees. Then, it is assumed that the first state shown in FIG. 3 is turned into the second state shown in FIG. 4 in which the movable plate 311a turns at the maximum deflection angle $\theta_{max}$ that is, for example, 80 degrees. Also in this case, since it is acceptable if a relationship, the ratio $\theta_{max}/\theta_0=1.03$, is satisfied, it is acceptable if the light-receiving section 22 is disposed at a position where the follow-up angle $\theta_0$ becomes 78 degrees.

By such control, even if the maximum deflection angle $\theta_{max}$ has considerably varied, it is possible to reliably maintain the detection accuracy of the maximum deflection angle $\theta_{max}$ in the light-receiving section 22. In this way, it can be ensured that the movable plate 311a turns at the maximum deflection angle $\theta_{max}$.

Second Embodiment

Figure 5:
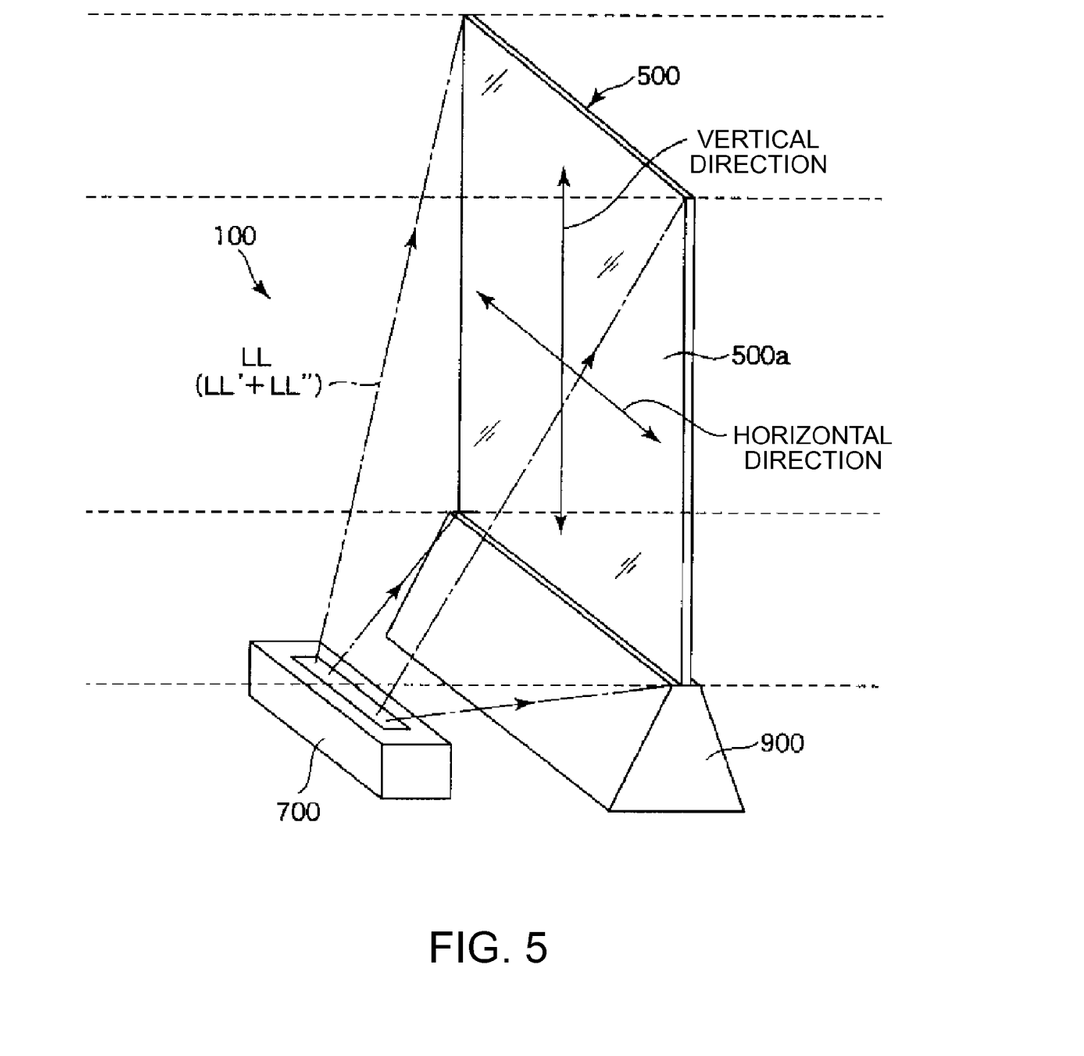
FIG. 5 is a perspective view showing an image forming apparatus according to a second embodiment of the invention.
Figure 6:
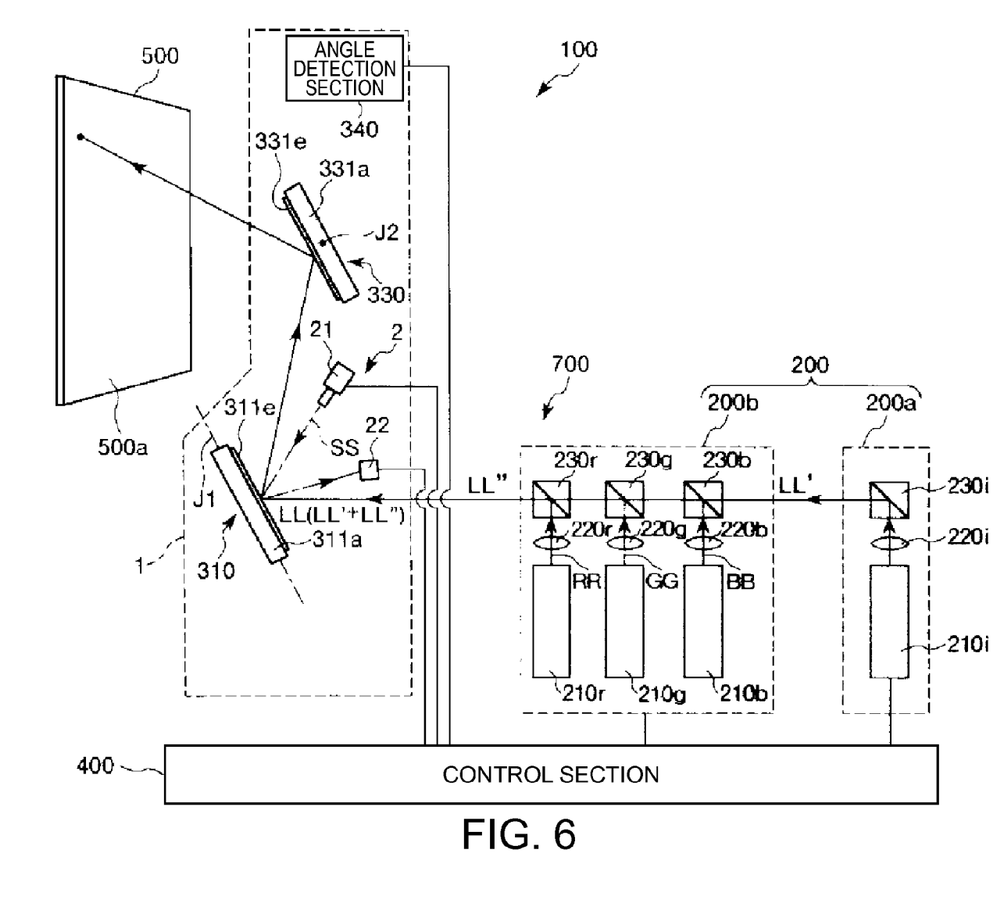
FIG. 6 is a diagram showing the schematic configuration of a projector which is included in the image forming apparatus shown in FIG. 5.
Figure 7:
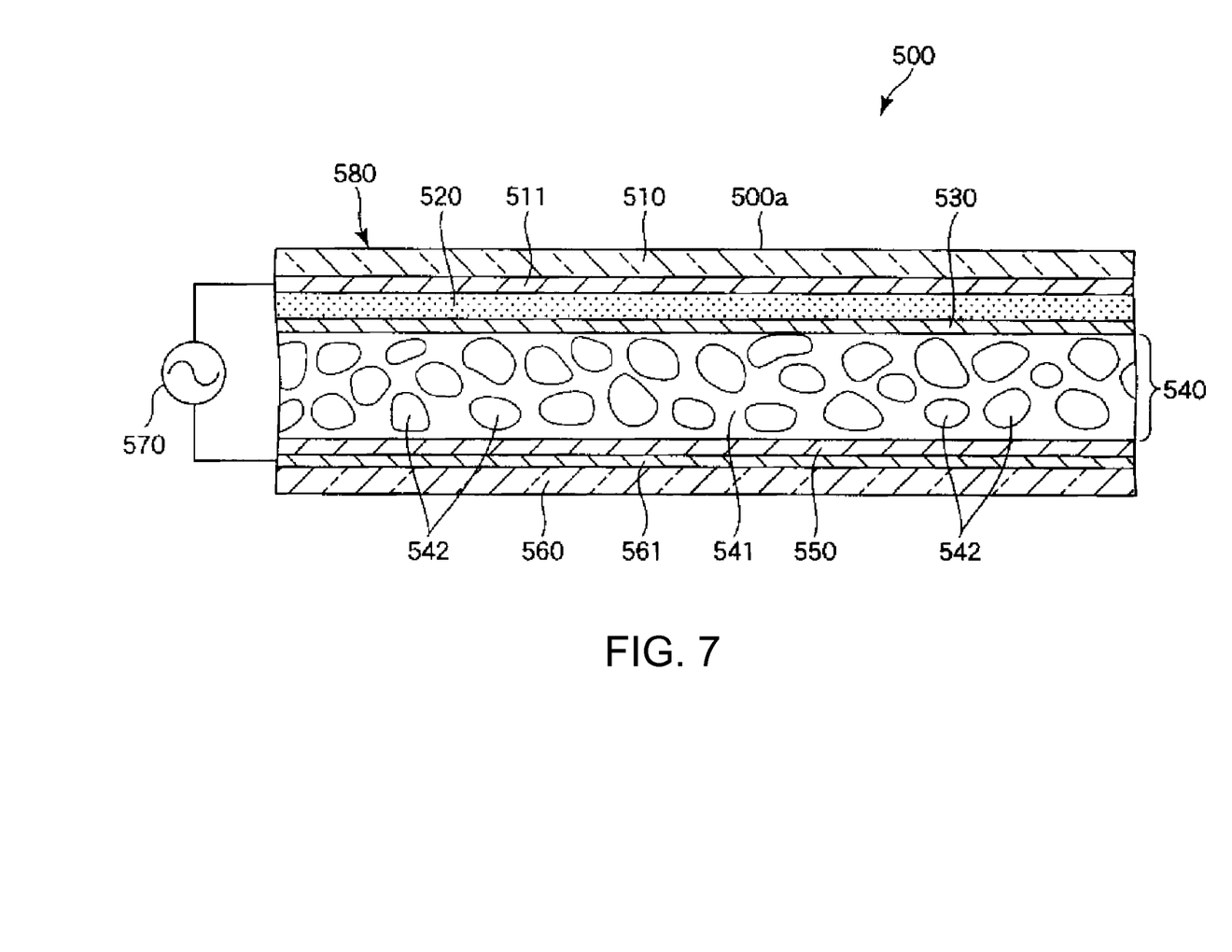
FIG. 7 is a cross-sectional view showing a screen (a display device) with which the image forming apparatus shown in FIG. 5 is provided.
Figure 8:
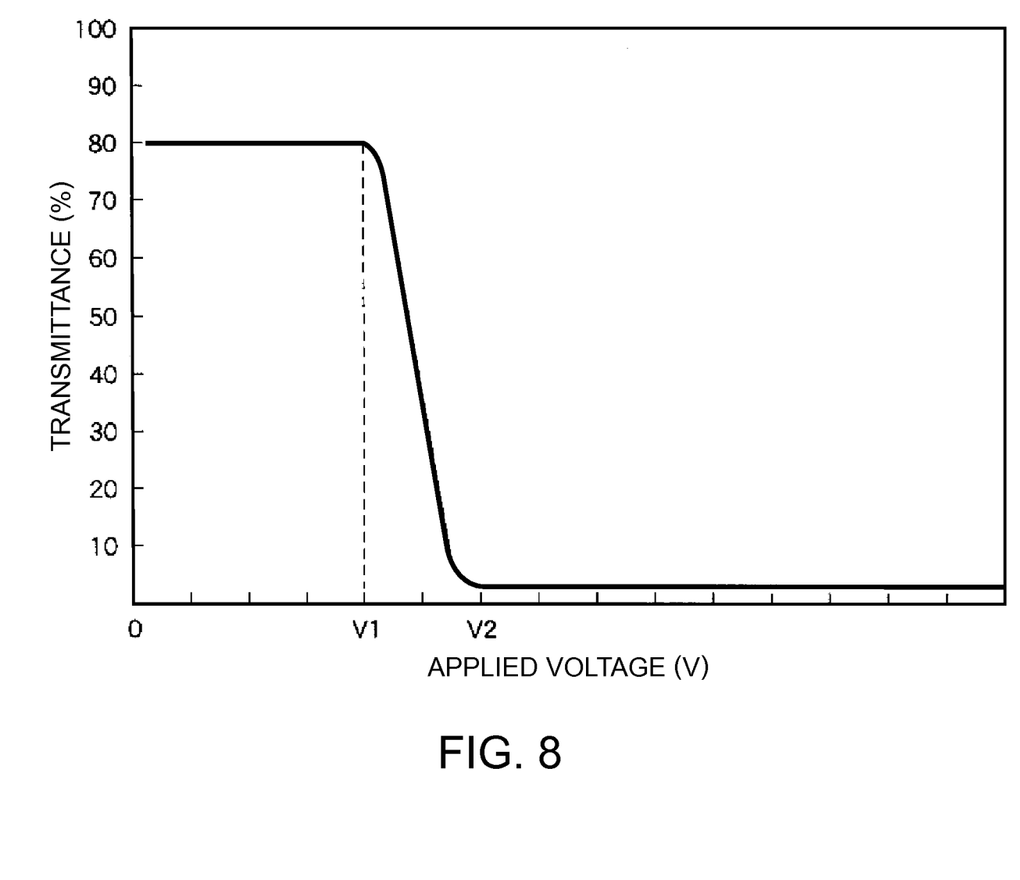
FIG. 8 is a graph showing the relationship between the transmittance of the screen shown in FIG. 7 and the intensity of voltage which is applied to a liquid crystal polymer composite layer.
Figure 9:
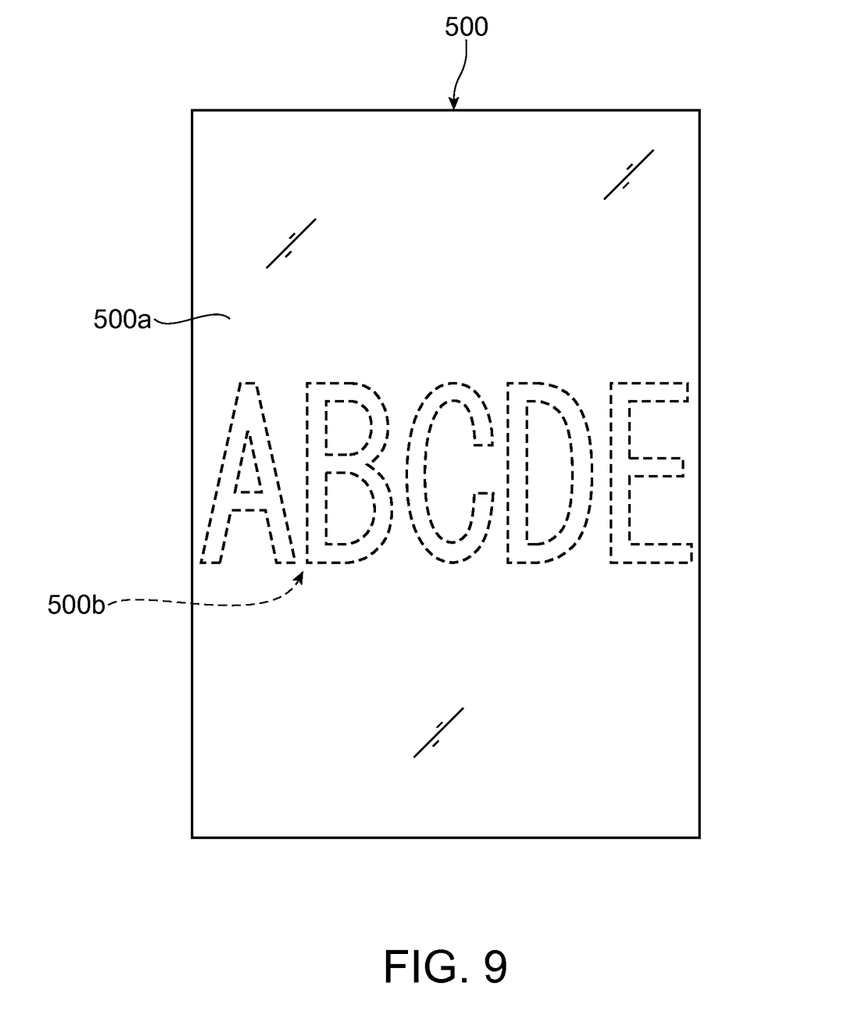
FIG. 9 is a diagram showing an operation state of the screen.
Figure 10:
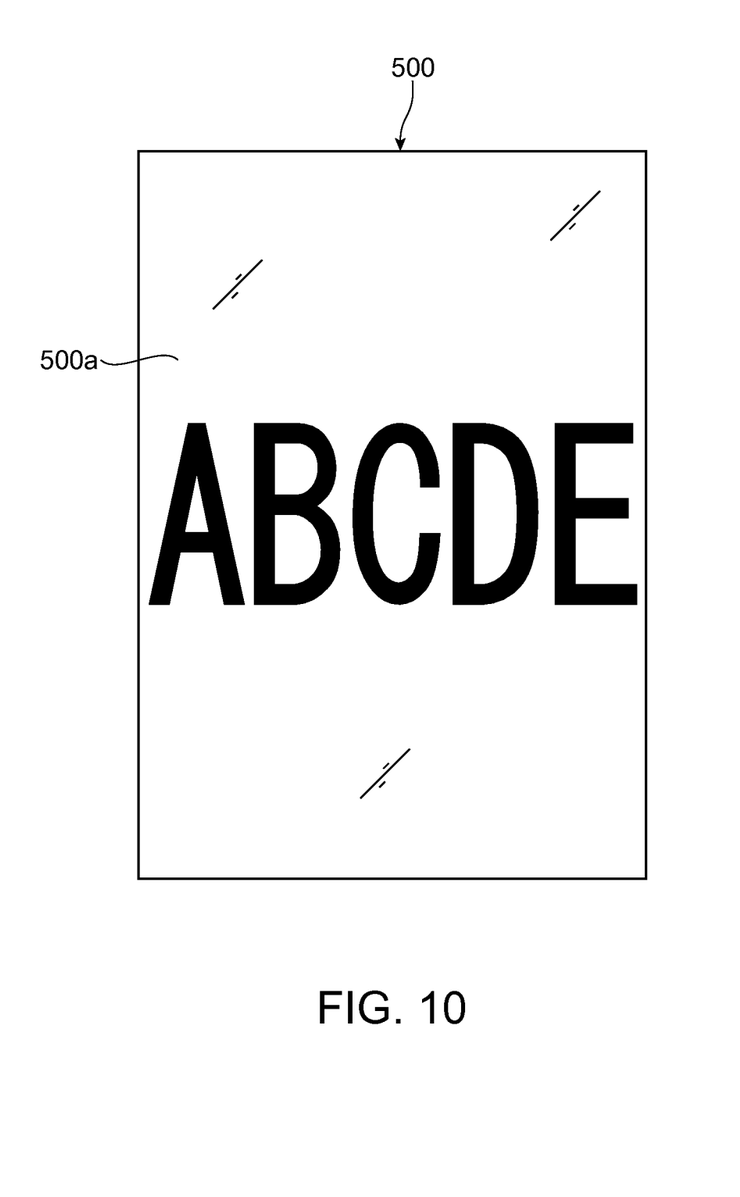
FIG. 10 is a diagram showing an operation state of the screen.

FIG. 5 is a perspective view showing an image forming apparatus according to the second embodiment of the invention, FIG. 6 is a diagram showing the schematic configuration of a projector which is included in the image forming apparatus shown in FIG. 5, FIG. 7 is a cross-sectional view showing a screen (a display device) with which the image forming apparatus shown in FIG. 5 is provided, FIG. 8 is a graph showing the relationship between the transmittance of the screen shown in FIG. 7 and the intensity of voltage which is applied to a liquid crystal polymer composite layer, and FIGS. 9 and 10 respectively are diagrams showing operation states of the screen. In addition, in the following, for convenience of explanation, the upper side in FIGS. 5, 9, and 10 is referred to as a "top" or an "upside" and the lower side is referred to as a "bottom" or a "downside". Further, the upper side in FIG. 7 is referred to as a "front (front face)" or a "front side" and the lower side is referred to as a "back (back face)" or a "back side".

Hereinafter, a light scanning device and an image forming apparatus according to the second embodiment of the invention will be described with reference to these drawings. However, a description is performed with a focus on the differences between this embodiment and the above-described embodiment, and with respect to the same matters, a description thereof is omitted.

This embodiment is the same as the above-described first embodiment except that this embodiment differs in the configurations of the screen and the projector from the first embodiment.

As shown in FIG. 5, in this embodiment, the screen 500 is supported in an upstanding state by a stage 900 and installed without being fixed to or hung on, for example, a wall or the like of a building.

Further, as shown in FIG. 6, in the image forming apparatus 100 according to this embodiment, the light source unit 200 of the projector 700 further includes a light source for address light 200a.

The screen 500 is colorless and transparent (in a light transmission state) when an image is not displayed, and is made such that the rear thereof is visible, just like a transparent glass plate. Then, when an image is displayed on the screen 500 by the projector 700, only the area of a display surface 500a, on which the image is displayed, is made to be in a cloudy state (a light diffusion state) and a desired image is displayed on the screen 500 by irradiating the area in the cloudy state with laser light LL from the projector 700. At this time, an area on which an image is not displayed remains kept a light transmission state (a transparent state). For this reason, according to the image forming apparatus 100 having such a configuration, first, the image forming apparatus 100 has the advantage that when not in use (when an image is not displayed), the screen 500 is not visually obstructive. Second, in use (when an image is displayed), since an image is displayed on a transparent plate, such a sensation that an image stands out can be imparted to a viewer, so that it is possible to effectively allow the viewer to be interested in and concerned about the image which is displayed. That is, according to the image forming apparatus 100, it is possible to exhibit excellent advertising effects.

As previously described, the image forming apparatus 100 includes the screen 500 and the projector 700. The configuration of each section will be described below. First, the screen 500 will be described.

As shown in FIG. 7, the screen 500 includes a screen main body 580 configured by laminating a first substrate 510 with a first electrode 511 formed thereon, a photoconductive film 520, an alignment film 530, a liquid crystal polymer composite layer (a liquid crystal layer) 540, an alignment film 550, and a second substrate 560 with a second electrode 561 formed thereon, in this order from the display surface 500a side, and a voltage application section 570 which applies voltage between the first electrode 511 and the second electrode 561. With such a configuration, it is possible to obtain the screen 500 capable of easily performing switching between the light transmission state and the light diffusion state as previously described. Each of the first substrate 510 and the second substrate 560 is constituted by a sheet-like (flat plate-like) member and has a function to support and protect each member which is disposed between these substrates. Further, each of the first substrate 510 and the second substrate 560 has optical transparency and is substantially colorless and transparent. Each of the first substrate 510 and the second substrate 560 may also have flexibility and may also be hard.

As a constituent material of each of the first substrate 510 and the second substrate 560, it is not particularly limited and, for example, glass, silicon, or polymer film such as polyester (polyethylene terephthalate), polysulfone, polyether sulfone, or polycarbonate can be used.

The first electrode 511 of a film shape is formed on the back surface (the surface on the liquid crystal polymer composite layer 540 side) of the first substrate 510, and the second electrode 561 of a film shape is formed on the front surface (the surface on the liquid crystal polymer composite layer 540 side) of the second substrate 560. Each of the first electrode 511 and the second electrode 561 has optical transparency and is substantially colorless and transparent. The first electrode 511 and the second electrode 561 are electrically connected to the voltage application section 570, and if voltage is applied between the first electrode 511 and the second electrode 561 by the voltage application section 570, an electric field is generated between these electrodes, and the generated electric field acts on the photoconductive film 520 and the liquid crystal polymer composite layer 540. As a constituent material of each of the first electrode 511 and the second electrode 561, provided that it has substantially conductivity and is substantially colorless and transparent, it is not particularly limited. As such a constituent material, for example, various conductive materials such as a metal material such as gold, silver, copper, aluminum, or alloys containing these, a carbon-based material such as carbon black, an electronically-conductive polymer material such as polyacetylene, polyfluorene, or derivatives thereof, an ion-conductive polymer material in which ionic substance such as NaCl or $Cu(CF_3SO_3)_2$ is dispersed in matrix resin such as polyvinyl alcohol or polycarbonate, and a conductive oxide material such as indium oxide (IO), indium tin oxide (ITO), or fluorine-doped tin oxide (FTO) can be given. As a constituent material of each of the first electrode 511 and the second electrode 561, one kind or the combination of two or more kinds of these can be used.

The photoconductive film 520 has a film shape and is formed on the back surface (the surface on the liquid crystal polymer composite layer 540 side) of the first electrode 511. Further, the photoconductive film 520 has optical transparency and is substantially colorless and transparent. As such a photoconductive film 520, it is acceptable if it is a film in which, if the film is irradiated with light, impedance changes in accordance with the light quantity thereof. Then, as the photoconductive film 520, for example, a film formed of charge generation substance by a vapor deposition method, a sputtering method, an ion plating method, a CVD method, or the like, a film formed by applying a material in which charge generation substance is dispersed in a resin binder, by a bar coating method, a spin coating method, a roll coating method, a dip method, a casting method, or the like, a film in which a charge transport layer is laminated on any of these charge generation layers, or the like can be used.

As the charge generation substance, it is not particularly limited and, for example, an inorganic material such as a-Si, ZnS, ZnO, CdS, CdSe, Se, SeTe, or TiO, or an organic material such as phthalocyanine series, azo series, polycyclic quinone series, indigo series, quinacridone series, perylene series, squalium series, azulenium series, cyanine series, or pyrylium series can be used.

Further, as the resin binder, it is not particularly limited and, for example, polycarbonate, polyarylate, polyethylene, polypropylene, polyester, polyvinyl acetate, polyvinyl butyral, acryl, methacryl, vinyl chloride, vinyl acetate, copolymers thereof, or the like can be used. As the charge transport substance, an organic material such as carbazole series, triazole series, oxadiazole series, imidazole series, pyrazoline series, hydrazone series, stilbene series, amine series, or nitrofluorenone series can be used.

The liquid crystal polymer composite layer 540 is in a state where particles of macromolecules 542 are dispersed in a liquid crystal 541 and phase separation is performed.

As the macromolecule 542, a macromolecule which is miscible with the liquid crystal 541 in a liquid crystal phase state and then phase-separated from the liquid crystal 541 when curing is used. As such a macromolecule 542, for example, provided that it is a macromolecule in which a side chain having a benzene skeleton or a biphenyl skeleton is added to a polymer main chain, a thermoplastic polymer, a thermal cure polymer, and an ultraviolet cure polymer can be widely used without distinction.

On the other hand, as the liquid crystal 541, a liquid crystal having positive dielectric anisotropy which is oriented in a direction parallel to the direction of an electric field is used. As such a liquid crystal 541, for example, a phenylcyclohexane derivative liquid crystal, a biphenyl derivative liquid crystal, a biphenylcyclohexane derivative liquid crystal, a terphenyl derivative liquid crystal, a phenyl ether derivative liquid crystal, a phenyl ester derivative liquid crystal, a bicyclohexane derivative liquid crystal, an azomethine derivative liquid crystal, an azoxy derivative liquid crystal, a pyrimidine derivative liquid crystal, a dioxane derivative liquid crystal, a cubane derivative liquid crystal, or the like can be used. Further, as the liquid crystal 541, in order to improve the contrast of the screen 500, it is preferable to use a liquid crystal in which refractive index anisotropy $\Delta n$ is as large as possible. The alignment films 530 and 550 have been subjected to an alignment treatment of making the liquid crystal 541 and the macromolecule 542 of the liquid crystal polymer composite layer 540 be oriented in a direction parallel to the first substrate 510 and the second substrate 560. The macromolecule 542 has a liquid crystal phase when it is oriented. However, since it is cured thereafter, the macromolecule 542 is fixed while an oriented state thereof is maintained. For this reason, in the macromolecule 542, even if an electric field is applied thereto thereafter, an orientation direction is not aligned with the direction of the electric field. On the other hand, in the liquid crystal 541, since an oriented state is not fixed, if an electric field is applied thereto, the liquid crystal 541 is aligned in the direction of the electric field. Therefore, in a case where an electric field is not applied to the liquid crystal polymer composite layer 540 (a case where the intensity of an electric field does not reach, for example, V1, as described later), the orientation direction of each of the macromolecule 542 and the liquid crystal 541 enters a state where it corresponds with a direction parallel to the first substrate 510 and the second substrate 560 (a state where the liquid crystal 541 and the macromolecule 542 are aligned and oriented). In this state, by making the refractive indices of the two correspond with each other, the screen 500 enters a transparent state (a light transmission state). On the contrary, in a case where an electric field is applied to the liquid crystal polymer composite layer 540, since the orientation direction of the liquid crystal 541 is aligned with the direction of the electric field (since s state is created where the liquid crystal 541 and the macromolecule 542 are oriented in different directions), a light scattering state is created by a mismatch of the refractive index at the interface between the liquid crystal 541 and the macromolecule 542 in the direction of the electric field, so that the screen 500 enters a cloudy state (a light diffusion state). According to such a liquid crystal polymer composite layer 540, since when voltage is not applied, a colorless and transparent light transmission state is created and a cloudy light diffusion state is created by application of voltage, it is possible to obtain the screen 500 suitable for the use of the image forming apparatus 100. In addition, such switching between the light transmission state and the light diffusion state can be performed independently at each site of the display surface 500a.

The switching between the light transmission state and the light diffusion state will be described in detail.

The macromolecule 542 and the liquid crystal 541 shown in FIG. 7 exhibit the same refractive index anisotropy, and a refractive index in a direction parallel to an orientation direction is about 1.5 and a refractive index in a direction vertical to an orientation direction is about 1.7. In a state where an electric field is not applied to the liquid crystal polymer composite layer 540, since the liquid crystal 541 is oriented in the same direction as that of the macromolecule 542, the refractive indices of the liquid crystal 541 and the macromolecule 542 in a direction perpendicular to the first substrate 510 and the second substrate 560 conform to each other. Therefore, in this state, the screen 500 enters a substantially colorless and transparent state (a light transmission state) in which transmittance is about 80%.

On the other hand, if voltage is applied between the first electrode 511 and the second electrode 561 by the voltage application section 570, so that an electric field acts on the liquid crystal polymer composite layer 540, the orientation direction of the macromolecule 542 remains as it is, whereas only the liquid crystal 541 is oriented in the direction of the electric field, that is, a direction perpendicular to the first substrate 510 and the second substrate 560. For this reason, in the direction of the electric field perpendicular to the first substrate 510 and the second substrate 560, the refractive index of the macromolecule 542 remains at about 1.7, whereas the refractive index of the liquid crystal 541 changes to about 1.5. Therefore, a difference in refractive index between the macromolecule 542 and the liquid crystal 541 in the direction of the electric field becomes about 0.2, so that light incident from a direction perpendicular to the first substrate 510 and the second substrate 560 is scattered. As a result, in this state, the screen 500 enters a state (a light diffusion state) of being cloudy in the direction of the electric field.

Next, the relationship between the transmittance of the screen 500 and the intensity of voltage which is applied to the liquid crystal polymer composite layer 540 will be described with reference to FIG. 8.

As shown in FIG. 8, before the intensity of voltage which is applied to the liquid crystal polymer composite layer 540 exceeds V1, the screen 500 maintains a high transmittance of about 80%, thereby maintaining a substantially colorless and transparent state. Then, after the intensity of the voltage exceeds V1 and before it reaches V2, a transmittance steeply decreases, and if the intensity of the voltage exceeds V2, a transmittance becomes almost zero. In this manner, in the screen 500, it can be found that a transmittance does not decrease linearly with respect to the magnitude of voltage which is applied to the liquid crystal polymer composite layer 540 and a transmittance steeply decreases when the voltage exceeds a given voltage V1.

How to use the screen 500 having the configuration as described above will be described.

First, voltage (alternating voltage) is applied between the first electrode 511 and the second electrode 561 by the voltage application section 570 (in the following, this state is also referred to as a "standby state"). It is preferable that the intensity of the voltage which is applied be such intensity that voltage which is actually applied to the liquid crystal polymer composite layer 540 is slightly lower than V1 or becomes equal to V1. In this way, it is possible to keep the screen 500 substantially colorless and transparent in the standby state and also to change the screen 500 to a light diffusion state by slightly increasing voltage from the standby state. In addition, in this embodiment, the intensity of the voltage which is applied between the first electrode 511 and the second electrode 561 is determined such that the transmittance of the screen 500 in the standby state becomes about 80%. However, the transmittance of the screen 500 in the standby state is not particularly limited and may also be set to be, for example, about 70%. It is acceptable if the transmittance is appropriately set according to a transmittance which is sought in the standby state of the screen 500.

Subsequently, a desired site (a minute area) of the display surface 500a of the screen 500 in the standby state is irradiated with address light LL' from the projector 700. Then, in the site irradiated with the address light LL', the electric resistance of the photoconductive film 520 decreases by irradiation of the address light LL', so that actual voltage which is applied to the liquid crystal polymer composite layer 540 increases. In this way, the transmittance of the site decreases, so that the site becomes cloudy, thereby entering a light diffusion state. On the other hand, with respect to a site which is not irradiated with the address light LL', since the intensity of the voltage which has been applied to the liquid crystal polymer composite layer 540 does not change, the light transmission state is maintained. Then, by forming a site in a light diffusion state in response to an image which is displayed on the display surface 500a, that is, in an area on which an image is displayed, a light diffusion region 500b (a region actually functioning as a screen) along the outline of an image is formed on the display surface 500a, as shown in FIG. 9, for example.

As the light quantity of the address light LL' which is irradiated to the display surface 500a, provided that it is possible to reduce the transmittance of a site irradiated with the address light LL', it is not particularly limited. However, such light quantity that the transmittance of the screen 500 becomes equal to or less than 20% is preferable, and such light quantity that the transmittance of the screen 500 becomes equal to or less than 5% is more preferable. In this way, it is possible to form the light diffusion region 500b having excellent light diffusivity.

In this manner, the screen 500 is used so as to make it colorless and transparent in the standby state and make only an area on which an image is displayed, be in a light diffusion state. In this way, it is possible to exhibit excellent advertising effects as previously described.

Next, the projector 700 will be described.

As shown in FIG. 6, in this embodiment, the projector 700 includes the light source unit 200 which emits the laser light LL. The light source unit 200 has, in addition to the light source for display light 200b, the light source for address light 200a which emits the address light LL' for making an area corresponding to a desired image of the display surface 500a be in a light diffusion state so as to be able to display the desired image on the display surface 500a.

The projector 700 is configured so as to display (form) a desired image on the display surface 500a by scanning the display surface 500a with the address light LL' and also scanning an area entered a light diffusion state by irradiation of the address light LL', with the display light LL". In this way, since a process (refer to FIG. 9) of forming the light diffusion region 500b on the display surface 500a and a process (refer to FIG. 10) of forming an image in the light diffusion region 500b can be performed at approximately the same time by the single projector 700, the configuration of the image forming apparatus 100 is simplified and also the efficiency of image display is increased.

The light source for address light 200a includes a laser light source 210i which emits infrared laser as the address light LL', and a collimator lens 220i and a dichroic mirror 230i provided corresponding to the laser light source 210i. The address light LL' emitted from the laser light source 210i is collimated by the collimator lens 220i, thereby being turned into a thin beam, and then reflected by the dichroic mirror 230i. Then, the reflected address light LL' is combined with (superimposed on) the display light LL" and then emitted from the light source unit 200 as the laser light LL.

In this manner, by using the infrared laser as the address light LL', it is possible to prevent the address light LL' from being visible to a viewer and also prevent the address light LL' from affecting the color shade or the like of an image displayed on the display surface 500a, so that a desired image can be displayed on the display surface 500a.

In addition, in the light source for address light 200a, in place of the collimator lens 220i, a collimator mirror can be used, and also in this case, it is possible to form a thin beam having parallel light flux. Further, in a case where parallel light flux is emitted from the laser light source 210i, the collimator lens 220i can be omitted.

The light scanning device 1 can scan the display surface 500a of the screen 500 with the laser light LL emitted from the light source unit 200, by driving of the optical scanners 310 and 330. Here, the laser light LL is laser light in which the display light LL" that is laser light for image display and the address light LL' that is laser light for making a desired area of the display surface 500a be in a light diffusion state are combined with each other. For this reason, since it is possible to simultaneously irradiate the same site of the display surface 500a with the display light LL" and the address light LL' by the light scanning device 1, it is possible to reliably irradiate a site being in a light diffusion state with the display light LL", so that it is possible to display a desired image on the screen 500.

In addition, the control section 400 is configured so as to control operations of the light source unit 200 and the light scanning device 1 such that an area of the display surface 500a to be made to be in a light diffusion state is determined from image data transmitted from a computer (not shown) or the like, which is displayed on the display surface 500a of the screen 500, and the determined area is irradiated with the address light LL' and also the area entered the light diffusion state by the irradiation of the address light LL' is irradiated with the display light LL". In this way, it is possible to more reliably make only an area of the display surface 500a, on which it is desired to display an image, be in a light diffusion state, so that it is possible to display a desired image on the display surface 500a.

Specifically, first, the image data is input to the control section 400. Subsequently, the control section 400 seeks an area (a site) of the display surface 500a which is irradiated with the display light LL" when displaying the input image data on the display surface 500a. Next, the control section 400 drives the optical scanners 310 and 330 such that the sought area is irradiated with the address light LL', and also emits the address light LL' from the light source for address light 200a in response to (in synchronization with) the behaviors of the movable plates 311a and 331a, which are transmitted from the angle detection section 340 or the like.

Along with this, the control section 400 determines, on the basis of the input image data, the color and the light quantity of the irradiating display light LL" with respect to each site of an area of the display surface 500a which is irradiated with the display light LL", and emits, on basis of the determined color information, the display light LL" from the light source for display light 200b in response to (in synchronization with) the behaviors of the movable plates 311a and 331a. In this way, each site of the display surface 500a, on which an image is displayed, is irradiated with the laser light LL in which the address light LL' and the display light LL" are combined with each other.

If each site of the display surface 500a, on which an image is displayed, is irradiated with the laser light LL, the irradiated site is turned from a transparent state into a light diffusion state by the address light LL' which is included in the laser light LL (refer to FIG. 9). Then, since the area entered the light diffusion state is irradiated with the display light LL" which is included in the laser light LL, the irradiated display light LL" is reflected and diffused, so that a desired image is displayed. By performing this in each site of an area of the display surface 500a, on which an image is displayed, it is possible to display, for example, an image as shown in FIG. 10 on the display surface 500a.

In addition, since the screen 500 does not have a memory property, if irradiation of the address light LL' is not performed, a site which has been turned from a light transmission state into a light diffusion state by irradiation of the address light LL' returns to the light transmission state. For this reason, for example, in a case where an image which is displayed on the display surface 500a is a still image, it is preferable to continue to draw the still image at a relatively fast speed of, for example, about 60 frames/1 second. In this way, it is possible to display the still image without a flicker on the display surface 500a due to a residual image. Further, in a case where an image which is displayed on the display surface 500a is a moving image, when drawing of the n-th frame ends and the next frame is then drawn, since an image of the previous frame has been erased from the screen 500, a reset process such as first returning the entire area of the display surface 500a to a light transmission state is not required. In addition, it is preferable that the time from the end of drawing of the n-th frame to the start of drawing of the n+1-th frame be approximately equal to a time of return from a light diffusion state to a light transmission state due to non-irradiation of the address light LL'. In this way, it is possible to display a moving image in which the frames are sequenced consecutively well.

In the image forming apparatus 100 having such a configuration, the sense that an image stands out can be imparted to a viewer, as previously described, and further, the sizes of the image can be changed, and therefore, it is possible to effectively interest the viewer in the image. Then, when the size of the image is switched, the maximum deflection angle $\theta_{max}$ of the movable plate 311a is changed. However, even in this case, it can be reliably ensured that the movable plate 311a turns at the maximum deflection angle $\theta_{max}$ within a given range of detection accuracy. In this way, it is possible to reliably display an image that a viewer will be interested in. Although the light scanning device and the image forming apparatus according to the invention have been described above on the basis of the illustrated embodiments, the invention is not limited thereto and each section constituting the light scanning device and the image forming apparatus can be replaced with that having any configuration capable of fulfilling the same function. Further, any component may also be added. The entire disclosure of Japanese Patent Application No. 2011-087763, filed Apr. 11, 2011 is expressly incorporated by reference herein.

What is claimed is:

1. A light scanning device comprising:
a movable section which has a light reflection section reflecting light and oscillates around an oscillating axis and in which a maximum deflection angle thereof is variable; and
a detection section which detects the maximum deflection angle of the movable section,
wherein the detection section includes
a light source which irradiates light toward the light reflection section,
a light-receiving section which receives reflected light of the light from the light source, reflected by the light reflection section, and
a displacement drive section which changes a position of the light-receiving section in accordance with the maximum deflection angle of the movable section.

2. The light scanning device according to claim 1, wherein when the maximum deflection angle is set to be $\theta max$ and an angle made by the light source, the oscillating axis of the movable section, and the light-receiving section is set to be $2\theta 0$, the displacement drive section changes the position of the light-receiving section such that a ratio $\theta max/\theta 0$ of $\theta max$ and $\theta 0$ becomes constant.

3. The light scanning device according to claim 2, wherein the ratio $\theta max/\theta 0$ is any value of values exceeding 1 and equal to or less than 1.3.

4. The light scanning device according to claim 1, wherein the displacement drive section includes
a motor having a rotating shaft,
a control section having a function to control an operation of the motor, and
a support beam which is connected to the shaft and supports the light-receiving section.

5. The light scanning device according to claim 4, wherein the shaft is disposed on the same axis as the oscillating axis of the movable section.

6. The light scanning device according to claim 1, wherein the displacement drive section has a function to regulate a distance between the movable section and the light-receiving section to be constant.

7. The light scanning device according to claim 1, wherein the light-receiving section is a photodiode.

8. The light scanning device according to claim 1, wherein the light source is configured so as to perform irradiation of laser light.

9. The light scanning device according to claim 1, wherein when forming an image on an upstanding screen by light, the movable section performs horizontal light scanning on the screen by the light reflection section.

10. An image forming apparatus comprising:
the light scanning device according to claim 1,
wherein the light reflection section performs light scanning, and forms an image.

11. An image forming apparatus comprising:
the light scanning device according to claim 2,
wherein the light reflection section performs light scanning, and forms an image.

12. An image forming apparatus comprising:
the light scanning device according to claim 3,
wherein the light reflection section performs light scanning, and forms an image.

13. An image forming apparatus comprising:
the light scanning device according to claim 4,
wherein the light reflection section performs light scanning, and forms an image.

14. An image forming apparatus comprising:
the light scanning device according to claim 5,
wherein the light reflection section performs light scanning, and forms an image.

15. An image forming apparatus comprising:
the light scanning device according to claim 6,
wherein the light reflection section performs light scanning, and forms an image.

16. An image forming apparatus comprising:
the light scanning device according to claim 7,
wherein the light reflection section performs light scanning, and forms an image.

17. An image forming apparatus comprising:
the light scanning device according to claim 8,
wherein the light reflection section performs light scanning, and forms an image.

18. An image forming apparatus comprising:
the light scanning device according to claim 9,
wherein the light reflection section performs light scanning, and forms an image.

19. An image forming apparatus comprising:
a movable section which has a light reflection section reflecting light and oscillates around an oscillating axis and in which a maximum deflection angle thereof is variable; and
a detection section which detects the maximum deflection angle of the movable section,
wherein the detection section includes
a light source which irradiates light toward the light reflection section,
a light-receiving section which receives reflected light of the light from the light source, reflected by the light reflection section, and
a displacement drive section which changes a position of the light-receiving section in accordance with the maximum deflection angle of the movable section, and
an image is formed by performing light scanning by the light reflection section.

* * * * *